(12) United States Patent
Matsumoto

(10) Patent No.: US 8,568,880 B2
(45) Date of Patent: Oct. 29, 2013

(54) PROCESS FOR PRODUCING SPHERICAL PARTICLES OF FURFURYL ALCOHOL RESIN, SPHERICAL PARTICLES OF FURFURYL ALCOHOL RESIN PRODUCED THEREBY, AND SPHERICAL CARBON PARTICLES AND SPHERICAL ACTIVATED CARBON PARTICLES OBTAINED USING THE SAME

(75) Inventor: Yasuhiro Matsumoto, Niwa-Gun (JP)

(73) Assignee: Asahi Organic Chemicals Industry Co., Ltd., Nobeoka-Shi (JP)

( * ) Notice: Subject to any disclaimer, the term of this patent is extended or adjusted under 35 U.S.C. 154(b) by 0 days.

(21) Appl. No.: 13/472,851

(22) Filed: May 16, 2012

(65) Prior Publication Data

US 2012/0225293 A1    Sep. 6, 2012

Related U.S. Application Data

(63) Continuation of application No. PCT/JP2010/066065, filed on Sep. 16, 2010.

(30) Foreign Application Priority Data

Feb. 1, 2010   (JP) .................................. 2010-019946

(51) Int. Cl.
*B32B 5/16*   (2006.01)

(52) U.S. Cl.
USPC .............. 428/403; 428/402; 427/212; 521/77

(58) Field of Classification Search
USPC ....................... 428/402, 403; 521/77; 427/212
See application file for complete search history.

(56) References Cited

U.S. PATENT DOCUMENTS

| | | | | |
|---|---|---|---|---|
| 3,451,984 A | * | 6/1969 | Bourguignon et al. | 526/221 |
| 4,132,683 A | * | 1/1979 | Larsen et al. | 521/106 |
| 4,594,287 A | * | 6/1986 | Hucke | 428/320.2 |

FOREIGN PATENT DOCUMENTS

| | | |
|---|---|---|
| GB | 1 408 873 A | 10/1975 |
| JP | 27-000942 B1 | 3/1952 |
| JP | 48-038362 A1 | 6/1973 |
| JP | 49-030499 A1 | 3/1974 |
| JP | 58-145728 A1 | 8/1983 |
| JP | 59-056425 A1 | 3/1984 |
| JP | 2007-063377 A1 | 3/2007 |
| JP | 2007-066669 A1 | 3/2007 |

OTHER PUBLICATIONS

International Search Report dated Dec. 7, 2010 (with English translation).
U.S. Appl. No. 13/732,595, filed Jan. 2, 2013, Matsumoto, Yasuhiro.
U.S. Appl. No. 13/961,349, filed Aug. 7, 2013, by Matsumoto et. al.

* cited by examiner

*Primary Examiner* — Leszek Kiliman
(74) *Attorney, Agent, or Firm* — Burr & Brown

(57) ABSTRACT

Provided is a process for advantageously producing spherical particles of furfuryl alcohol resin without irradiating the reaction system with ultrasonic waves and without using a harmful aldehyde as a starting material. In the process, furfuryl alcohol is subjected to resinification and curing to form spherical fine particles of furfuryl alcohol resin. More specifically, the furfuryl alcohol is subjected to a self-condensation with an acid catalyst having a pKa of less than 1.5 in the presence of a protective colloid and then heated for curing to form spherical particles of furfuryl alcohol resin.

12 Claims, No Drawings

PROCESS FOR PRODUCING SPHERICAL PARTICLES OF FURFURYL ALCOHOL RESIN, SPHERICAL PARTICLES OF FURFURYL ALCOHOL RESIN PRODUCED THEREBY, AND SPHERICAL CARBON PARTICLES AND SPHERICAL ACTIVATED CARBON PARTICLES OBTAINED USING THE SAME

This application is a continuation of the International Application No. PCT/JP2010/066065 filed Sep. 16, 2010, which claims the benefit under 35 U.S.C. §119(a)-(d) of Japanese Patent Application No. 2010-019946, filed Feb. 1, 2010, the entirety of which is incorporated herein by reference.

TECHNICAL FIELD

The present invention relates to a process for producing spherical particles of furfuryl alcohol resin, spherical particles of furfuryl alcohol resin produced thereby, spherical carbon particles obtained by firing the spherical particles of furfuryl alcohol resin, and spherical activated carbon particles obtained by activating the spherical particles of furfuryl alcohol resin.

BACKGROUND ART

The spherical resin particle have been used in various fields such as filler, flame retardant, abrasive, pore forming material, spacer, and carbon material precursor, due to its characteristics. The spherical particle of furan resin is one kind of such spherical resin particles and obtained using furan as a starting material. JP-A-2007-66669 discloses that the spherical particles of furan resin are produced by the reaction of a furan compound such as furfural or furfuryl alcohol and aldehyde such as formaldehyde or paraformaldehyde. Although the use of the spherical particles of furan resin as an electrode material of battery is discussed therein, a harmful substance, i.e., aldehyde such as formaldehyde, is used as a starting material. Thus, careful consideration should be given to work environment as well as the reaction condition with a furan compound such as furfuryl alcohol.

JP-A-2007-63377 discloses a process for producing a furan resin using aldehyde such as formaldehyde or paraformaldehyde together with a furan compound such as furfural or furfuryl alcohol, in which addition condensation reaction is conducted by irradiating the reaction system with ultrasonic waves in order to obtain spherical resin nanoparticles. In this process, in addition to the problems caused by the use of aldehyde such as formaldehyde, there is another problem that the reaction system should be irradiated with the ultrasonic waves, which requires a special apparatus for the irradiation.

SUMMARY OF INVENTION

The present invention has been made in the light of the situations described above. It is an object of the present invention to provide a process for advantageously producing spherical particles of furfuryl alcohol resin, in which furfuryl alcohol is resinified and cured, without irradiating the reaction system with ultrasonic waves and without using a harmful aldehyde as a starting material. It is further objects of the present invention to provide spherical particles of furfuryl alcohol resin produced by the process, spherical carbon particles obtained by firing the resin particles, and spherical activated carbon particles obtained by activating the spherical carbon particles.

The inventor of the present invention has conducted intensive studies to achieve the above-described objects and found that, by resinifing furfuryl alcohol through a self-condensation reaction in the presence of an acid catalyst having a pKa of less than 1.5 and a protective colloid, which is followed by curing, spherical particles of furfuryl alcohol resin having an average particle diameter of 0.01 μm to 1000 μm can be advantageously produced without irradiating the reaction system with the ultrasonic waves and without using the harmful aldehyde as a starting material. The present inventor has conducted further studies based on the above finding and eventually completed the present invention.

The present invention was made based on the above findings, and a first aspect of the present invention provides a process for producing spherical particles of furfuryl alcohol resin including the steps of: resinifying furfuryl alcohol through a self-condensation reaction with an acid catalyst having a pKa of less than 1.5 in the presence of protective colloid; and heating a resinified product of the furfuryl alcohol for curing.

According to preferable aspects of the process for producing spherical particles of furfuryl alcohol resin of the present invention, the acid catalyst is alkylbenzenesulfonic acid, especially, alkylbenzenesulfonic acid having a carbon number of 10 or more. Advantageously, 0.5 to 25 times by mass of water with respect to the amount of the furfuryl alcohol is used as a reaction medium. Further, it is advantageous that the protective colloid is a gum arabic.

In accordance with the present invention, a spherical particle of furfuryl alcohol resin having an average particle diameter of 0.01 μm to 1000 μm can be advantageously produced. By firing such a spherical particle of furfuryl alcohol resin, a spherical carbon particle is produced, and further by activating the spherical carbon particle, a spherical activated carbon particle is produced.

The present invention can easily produce spherical particles of furfuryl alcohol resin having an average particle diameter of 0.01 μm to 1000 μm without a special device for irradiating the reaction system with the ultrasonic waves and without the harmful aldehyde as a starting material. Thus, fine spherical particles of furfuryl alcohol resin can be industrially advantageously provided.

In the present invention, the fine spherical particles are obtained by subjecting the furfuryl alcohol (alone) to a self-condensation for resinification and to a three-dimensional cross-linking (curing) through cleave of furan ring, thereby industrially advantageously obtaining the furfuryl alcohol resin particles. Further, the carbon particles and the activated carbon particles that are obtained through carbonization and activation of the spherical resin particles can be used for various applications.

DETAILED DESCRIPTION OF THE INVENTION

In the production of the fine spherical particles of the furfuryl alcohol resin according to the present invention, furfuryl alcohol is resinified through a self-condensation reaction in the presence of water as a reaction medium, an acid catalyst having a pKa of less than 1.5, and a protective colloid. The resinification is followed by heating for curing. Then, the reaction liquid product containing the produced resin particles is filtered and purified to obtain the fine spherical particles having an average particle diameter of 0.01 μm to 1000 μm.

The protective colloid, which is present in the reaction system of such furfuryl alcohol, is added to make furfuryl alcohol resin in a spherical particle form. Any conventionally known protective colloid may be used. Examples of the protective colloid that is suitably used for the present invention include, but not limited to, gum arabic, gum ghatti, hydroxyl alkyl guar gum, partially hydrolyzed polyvinyl alcohol, hydroxyethyl cellulose, hydroxypropyl cellulose, and carboxymethyl cellulose. Especially, gum arabic is preferably used in the present invention.

Any one of, or any combination of the protective colloids may be used. Further, a surfactant may be used together with the protective colloid. Although an amount of the protective colloid is suitably determined depending on the kind of the protective colloid to be used, generally, the protective colloid is added at a ratio of about 0.1 to 10% by mass, preferably about 0.5 to 5% by mass, and more preferably about 1 to 3% by mass, with respect to the furfuryl alcohol.

In the present invention, together with the above-described protective colloid, an acid catalyst having a pKa of less than 1.5 is used as a catalyst for a self-condensation reaction (resinification) and for curing of the furfuryl alcohol. The acid catalyst allows the produced furfuryl alcohol resin to be effectively microparticulated, thereby advantageously producing the fine spherical particles having an average particle diameter of 0.01 μm to 1000 μm. The use of the acid catalyst having the pKa of 1.5 or more may cause insufficient self-condensation reaction (resinification) and insufficient curing of the resinified furfuryl alcohol, and ineffective microparticulation of the resin particles.

Examples of suitable acid catalysts for use in the invention include hydrochloric acid, sulfuric acid, nitric acid, oxalic acid, trifluoroacetic acid, methanesulfonic acid, benzenesulfonic acid, para toluene sulfonic acid, phenolsulfonic acid, decylbenzene sulfonic acid, dodecylbenzene sulfonic acid, tetradecyl benzene sulfonic acid, hexadecyl benzene sulfonic acid, and octadecyl benzene sulfonic acid. Any one of, or any combination of the above acid catalysts may be used. Advantageously, alkylbenzene sulfonic acid, especially alkylbenzene sulfonic acid having a carbon number of 10 or more is favorably used. In view of economic efficiency, availability, and catalystic function, it is especially recommended to use the dodecylbenzenesulfonic acid.

The amount of the acid catalyst is suitably determined depending on the reaction condition of the furfuryl alcohol, and further depending on the kind of the protective colloid. Generally, the acid catalyst is used at a ratio of about 0.1 to 10% by mass, preferably about 0.5 to 7% by mass, and further preferably about 1 to 5% by mass, with respect to furfuryl alcohol. When the acid catalyst is used at a ratio of less than the above ratio, the object of the present invention may not be sufficiently achieved. On the other hand, when the acid catalyst is used at a ratio of more than the above ratio, a large amount of bubbles are generated during the reaction making it difficult to uniformly stir the reaction liquid, so that particles of 1 μm or less cannot be produced.

Further, the amount of the water as a reaction medium for use in the self-condensation reaction (resinification) of the furfuryl alcohol and for use in the proceeding of the curing reaction is determined depending on the reaction condition and the like. Generally, about 0.5 to 25 times by mass, preferably about 1 to 20 times by mass, and more preferably about 5 to 15 times by mass, of water with respect to the amount of the furfuryl alcohol is used. Less than 0.5 times by mass of water with respect to the furfuryl alcohol may cause agglomeration of the reaction product, for example. Larger than 25 times by mass of water with respect to the furfuryl alcohol may require too long reaction time, which is not economical.

Generally, the self-condensation reaction (resinification) and the curing (cross-linking) of the resinified furfuryl alcohol in accordance with the present invention is, in view of reaction efficiency, conducted at a temperature of not lower than 50° C., preferably at a temperature of not lower than 70° C., and more preferably at a temperature of not lower than 80° C., in order to microparticulate the resin to be produced. The self-condensation reaction (resinification) and the reaction of curing (cross-linking) can be conducted in separate steps. In the present invention, it is advantageous that the curing reaction is successively conducted after the self-condensation reaction. Further, the two reaction steps may be conducted at the same temperature, or the cure (cross-linking) reaction may be conducted at a higher temperature than the self-condensation reaction (resinification). Further, the reaction time is suitably determined in view of conditions such as the reaction temperature, the amount of water in the reaction system, and the degree of the condensation and curing of the product. Generally, the total of about one to fifty hours is required for the two reactions.

The spherical particles of furfuryl alcohol resin according to the present invention are obtained as spherical particles having an average diameter of 0.01 μm or more, preferably 0.1 μm or more, but 1000 μm or less, by filtering and purifying the reaction liquid product containing the resin particles produced through the reaction of the furfuryl alcohol as described above.

The spherical particles of furfuryl alcohol resin according to the present invention, which are obtained as above, are fired in accordance with the conventional method, thereby advantageously producing spherical carbon fine particles. For example, the resin particles are fired at a temperature of 400 to 850° C. under nitrogen atmosphere with an externally heated rotary furnace for carbonization, thereby advantageously producing the intended spherical carbon fine particles.

Further, the spherical carbon particles are subjected to an activation process to form intended spherical activated carbon particles. The activation process of the spherical carbon particles is conducted in accordance with a conventional process. For example, a gas activation or a chemical activation is conducted at a temperature of 500 to 1000° C. to advantageously form the intended activated carbon particles. This activation process may be successively conducted after the above-described carbonization step, or may be conducted as a separate step.

EXAMPLES

To further clarify the present invention, some examples of the invention will be described. It is to be understood that the invention is not limited to the details of illustrated examples and foregoing description, but may be embodied with various changes, modifications, and improvements, which may occur to those skilled in the art without departing from the scope of the invention. An average particle diameter and an actual carbon ratio of the spherical particles of furfuryl alcohol resin and a specific surface area of the spherical activated carbon particles of the following examples were determined in accordance with the following methods.

(1) Average Particle Diameter

An average particle diameter was determined as a volume average diameter ($D_{50}$) with a microtrac particle size distribution analyzer, MT3200II, manufactured by NIKKISO CO., LTD., JAPAN.

(2) Actual Carbon Ratio

An actual carbon ratio was calculated by the amount of weight change of the spherical particles of furfuryl alcohol resin after carbonization with the externally heated rotary kiln.

(3) Specific Surface Area

A specific surface area was determined with BELSORP-mini manufactured by BEL Japan, Inc., JAPAN.

Example 1

To a reaction vessel equipped with a thermometer, a stirring device, and a reflux condenser, 100 parts by mass of furfuryl alcohol, 147.75 parts by mass of water, 0.5 parts by mass of gum arabic, and 2.5 parts by mass of 10% aqueous solution of dodecylbenzenesulfonic acid (pKa=−2.0) were charged. While the contents were stirred, the contents in the reaction vessel were heated to a temperature of 80° C. so as to be reacted for two hours (self-condensation reaction). Then, the contents were subjected to a further reaction at a temperature of 100° C. for five hours (curing reaction). After the reaction, the contents in the reaction vessel were cooled to a room temperature. Then, the contents were filtered, purified, and dried to obtain the intended furfuryl alcohol resin particles. Then, it was confirmed that the obtained resin particles were spherical using SEM photograph, and the volume average diameter ($D_{50}$) of the obtained spherical resin particles was determined and Table 1 shows the result thereof.

The obtained spherical particles of furfuryl alcohol resin were heated at a temperature of 800° C. for thirty minutes under nitrogen atmosphere with an externally heated rotary kiln, thereby firing the spherical particles of furfuryl alcohol resin for carbonization. Thereafter, with the externally rotary kiln, the obtained spherical carbon particles were activated at 900° C. for four hours under mixed atmosphere of nitrogen and water vapor, thereby obtaining spherical activated carbon particles. Then, the actual carbon ratio of the spherical particles of furfuryl alcohol resin and the specific surface area of the spherical activated carbon particles were determined and Table 1 shows the result thereof.

Example 2

To a reaction vessel equipped with a thermometer, a stirring device, and a reflux condenser, 100 parts by mass of furfuryl alcohol, 147.75 parts by mass of water, 0.05 parts by mass of gum arabic, and 2.5 parts by mass of 10% aqueous solution of dodecylbenzenesulfonic acid were charged. While the contents were stirred, the contents in the reaction vessel were heated to a temperature of 80° C. so as to be reacted for two hours (self-condensation reaction). Then, the contents were subjected to a further reaction at a temperature of 100° C. for five hours (curing). After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

The obtained spherical particles of furfuryl alcohol resin were heated at a temperature of 800° C. for thirty minutes under nitrogen atmosphere with an externally heated rotary kiln, thereby firing the spherical particles of furfuryl alcohol resin for carbonization. Thereafter, with the externally rotary kiln, the obtained spherical carbon particles were activated at 900° C. for five hours under mixed atmosphere of nitrogen and water vapor, thereby obtaining spherical activated carbon particles. Then, the actual carbon ratio of the spherical particles of furfuryl alcohol resin and the specific surface area of the spherical activated carbon particles were determined and Table 1 shows the result thereof.

Example 3

To a reaction vessel equipped with a thermometer, a stirring device, and a reflux condenser, 100 parts by mass of furfuryl alcohol, 72.75 parts by mass of water, 0.5 parts by mass of gum arabic, and 2.5 parts by mass of 10% aqueous solution of dodecylbenzenesulfonic acid were charged. While the contents were stirred, the contents in the reaction vessel were heated to a temperature of 80° C. so as to be reacted for two hours (self-condensation reaction). Then, the contents were subjected to a further reaction at a temperature of 100° C. for five hours (curing). After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

The obtained spherical particles of furfuryl alcohol resin were heated at a temperature of 650° C. for thirty minutes under nitrogen atmosphere with an externally heated rotary kiln, thereby firing the spherical particles of furfuryl alcohol resin for carbonization. Thereafter, with the externally rotary kiln, the obtained spherical carbon particles were activated at 900° C. for five hours under mixed atmosphere of nitrogen and water vapor, thereby obtaining spherical activated carbon particles. Then, the actual carbon ratio of the spherical particles of furfuryl alcohol resin and the specific surface area of the spherical activated carbon particles were determined and Table 1 shows the result thereof.

Example 4

To a reaction vessel equipped with a thermometer, a stirring device, and a reflux condenser, 100 parts by mass of furfuryl alcohol, 97.75 parts by mass of water, 0.08 parts by mass of gum arabic, and 2.5 parts by mass of 10% aqueous solution of dodecylbenzenesulfonic acid were charged. While the contents were stirred, the contents in the reaction vessel were heated to a temperature of 80° C. so as to be reacted for two hours (self-condensation reaction). Thereafter, the contents were subjected to a further reaction at a temperature of 100° C. for five hours (curing). After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

The obtained spherical particles of furfuryl alcohol resin were heated at a temperature of 650° C. for thirty minutes under nitrogen atmosphere with an externally heated rotary kiln, thereby firing the spherical particles of furfuryl alcohol resin for carbonization. Thereafter, with the externally rotary kiln, the obtained spherical carbon particles were activated at 800° C. for seventeen hours under mixed atmosphere of nitrogen and water vapor, thereby obtaining spherical activated carbon particles. Then, the actual carbon ratio of the spherical particles of furfuryl alcohol resin and the specific surface area of the spherical activated carbon particles were determined and Table 1 shows the result thereof.

Example 5

To a reaction vessel equipped with a thermometer, a stirring device, and a reflux condenser, 100 parts by mass of furfuryl alcohol, 97.75 parts by mass of water, and 2.5 parts by mass of 10% aqueous solution of dodecylbenzenesulfonic acid were charged. While the contents were stirred, the contents in the reaction vessel were heated to a temperature of 80° C. so as to be reacted for two hours (self-condensation reaction). Thereafter, the contents were subjected to a further reaction at a temperature of 100° C. for five hours (curing). After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

The obtained spherical particles of furfuryl alcohol resin were heated at a temperature of 500° C. for thirty minutes under nitrogen atmosphere with an externally heated rotary kiln, thereby firing the spherical particles of furfuryl alcohol resin for carbonization. Thereafter, with the externally rotary kiln, the obtained spherical carbon particles were activated at 800° C. for nine hours under mixed atmosphere of nitrogen and water vapor, thereby obtaining spherical activated carbon particles. Then, the actual carbon ratio of the spherical particles of furfuryl alcohol resin and the specific surface area of the spherical activated carbon particles were determined and Table 1 shows the result thereof.

Example 6

To a reaction vessel equipped with a thermometer, a stirring device, and a reflux condenser, 100 parts by mass of furfuryl alcohol, 291 parts by mass of water, 1 part by mass of gum arabic, and 10 parts by mass of 10% aqueous solution of dodecylbenzenesulfonic acid were charged. While the contents were stirred, the contents in the reaction vessel were heated to a temperature of 100° C. so as to be reacted for seven hours, thereby consecutively performing self-condensation reaction and curing. After the reaction, the content in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

The obtained spherical particles of furfuryl alcohol resin were heated at a temperature of 650° C. for thirty minutes under nitrogen atmosphere with an externally heated rotary kiln, thereby firing the spherical particles of furfuryl alcohol resin for carbonization. Then, the actual carbon ratio of the spherical particles of furfuryl alcohol resin was determined and Table 1 shows the result thereof.

Example 7

To a reaction vessel equipped with a thermometer, a stirring device, and a reflux condenser, 100 parts by mass of furfuryl alcohol, 973 parts by mass of water, 2 parts by mass of gum arabic, and 30 parts by mass of 10% aqueous solution of dodecylbenzenesulfonic acid were charged. As with Example 6, while the contents were stirred, the contents in the reaction vessel were heated to a temperature of 100° C. so as to be reacted for seven hours. After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

Example 8

To a reaction vessel equipped with a thermometer, a stirring device, and a reflux condenser, 100 parts by mass of furfuryl alcohol, 473 parts by mass of water, 2 parts by mass of gum arabic, and 30 parts by mass of 10% aqueous solution of dodecylbenzenesulfonic acid were charged. As with Example 6, while the contents were stirred, the contents in the reaction vessel were heated to a temperature of 100° C. so as to be reacted for seven hours. After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

Example 9

To a reaction vessel equipped with a thermometer, a stirring device, and a reflux condenser, 100 parts by mass of furfuryl alcohol, 300 parts by mass of water, 1 part by mass of gum arabic, and 1 part by mass of para toluene sulfonic acid (pKa=−2.8) were charged. As with Example 6, while the contents were stirred, the contents in the reaction vessel were heated to a temperature of 100° C. so as to be reacted for seven hours. After the reaction, the contents in the reaction vessel were cooled to a room temperature. Then, the contents were filtered, purified, and dried to obtain the intended spherical particles of furfuryl alcohol resin. Then, the volume average diameter ($D_{50}$) of the obtained spherical resin particles was determined and Table 1 shows the result thereof.

The obtained spherical particles of furfuryl alcohol resin were heated at a temperature of 650° C. for thirty minutes under nitrogen atmosphere with an externally heated rotary kiln, thereby firing the spherical particles of furfuryl alcohol resin for carbonization. Then, the actual carbon ratio of the spherical particles of furfuryl alcohol resin was determined and Table 1 shows the result thereof.

Comparative Example 1

To a reaction vessel equipped with a thermometer, a stirring device, and a reflux condenser, 100 parts by mass of furfuryl alcohol, 500 parts by mass of water, 3 parts by mass of gum arabic, and 2 parts by mass of 89% aqueous solution of phosphoric acid (pKa=2.2) were charged. While the contents were stirred, the contents in the reaction vessel were heated to a temperature of 100° C. so as to be reacted for seven hours. After the reaction, the contents in the reaction vessel were cooled to a room temperature, but the reaction product was not cured.

Comparative Example 2

To a reaction vessel equipped with a thermometer, a stirring device, and a reflux condenser, 100 parts by mass of furfuryl alcohol, 147.75 parts by mass of water, 1 part by mass of non-ionic surfactant (PIONIN D409 available from TAKEMOTO OIL & FAT CO., LTD., JAPAN) and 2.5 parts by mass of 10% dodecylbenzene sulfonic acid were charged. While the contents were stirred, the contents in the reaction vessel were heated to a temperature of 80° C. so as to be reacted for two hours. Then, in the process of further heating the contents in the reaction vessel to a temperature of 100° C., the contents were agglomerated.

TABLE 1

| | | pKa | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|---|
| Content [Parts by Mass] | furfuryl alcohol | — | 100 | 100 | 100 | 100 | 100 | 100 | 100 | 100 | 100 | 100 | 100 |
| | 10% dodecylbenzene sulfonic acid | −2.0 | 2.5 | 2.5 | 2.5 | 2.5 | 2.5 | 10 | 30 | 30 | — | — | 2.5 |
| | para toluene sulfonic acid | −2.8 | — | — | — | — | — | — | — | — | 1 | — | — |
| | 89% phosphoric acid | 2.2 | — | — | — | — | — | — | — | — | — | 2 | — |
| | gum arabic | — | 0.5 | 0.05 | 0.5 | 0.08 | — | 1 | 2 | 2 | 1 | 3 | — |
| | hydroxyethyl cellulose | — | — | — | — | — | 1 | — | — | — | — | — | — |
| | non-inoic surfactant | — | — | — | — | — | — | — | — | — | — | — | 1 |
| | water | — | 147.75 | 147.75 | 72.75 | 97.75 | 97.75 | 291 | 973 | 473 | 300 | 500 | 147.75 |
| particle diameter ($D_{50}$) [μm] | | | 122 | 557 | 320 | 800 | 107 | 11.5 | 0.54 | 2.5 | 83 | uncured | gelled |
| actual carbon ratio [%] | | | 51 | 51 | 53 | 52 | 60 | 50 | — | — | 51 | — | — |
| specific surface area [m²/g] | | | 1382 | 1558 | 1533 | 1349 | 985 | — | — | — | — | — | — |

As apparent from Table 1, the spherical particles of furfuryl alcohol resin produced in all of Examples 1 to 9 in accordance with the process of the present invention have a volume average diameter ($D_{50}$) of less than 1000 μm. Especially, in Example 7 in which the dodecylbenzene sulfonic acid as the catalyst and the gum arabic as the protective colloid are used in a large amount, the spherical particles of furfuryl alcohol resin having a particle diameter of less than 1 μm were obtained. On the other hand, in Comparative Example 1 in which 89% aqueous solution of phosphoric acid was added instead of the dodecylbenzene sulfonic acid, and in Comparative Example 2 in which gum arabic and hydroxyethyl cellulose as the protective colloid were not added, uncured resin particles and agglomerated resin were obtained, and the intended spherical particles of furfuryl alcohol resin were not produced.

The invention claimed is:

1. A process for producing spherical particles of furfuryl alcohol resin comprising the steps of:
   resinifying furfuryl alcohol in an aqueous reaction medium through a self-condensation reaction with an acid catalyst having a pKa of less than 1.5 in the presence of a protective colloid to form spherical particles of a resinified product of the furfuryl alcohol; and
   heating the spherical particles of the resinified product of the furfuryl alcohol for curing.

2. The process for producing spherical particles of furfuryl alcohol resin according to claim 1, wherein the acid catalyst is alkylbenzenesulfonic acid.

3. The process for producing spherical particles of furfuryl alcohol resin according to claim 1, wherein the acid catalyst is alkylbenzenesulfonic acid having a carbon number of 10 or more.

4. The process for producing spherical particles of furfuryl alcohol resin according to claim 1, wherein the spherical furfuryl alcohol resin particles have an average particular diameter of 0.01 μm to 1000 μm.

5. The process for producing spherical particles of furfuryl alcohol resin according to claim 1, wherein 0.5 to 25 times by mass of water with respect to the amount of the furfuryl alcohol is used as a reaction medium.

6. The process for producing spherical particles of furfuryl alcohol resin according to claim 1, wherein the protective colloid is a gum arabic.

7. A spherical furfuryl alcohol resin particle obtained by the process according to claim 1.

8. A spherical furfuryl alcohol resin particle comprising a spherical resin particle obtained through a self-condensation reaction of furfuryl alcohol, wherein the spherical furfuryl alcohol resin particle has an average particle diameter of 0.01 μm to 1000 μm.

9. A spherical carbon particle obtained by firing the resin particles according to claim 7.

10. A spherical carbon particle obtained by firing the resin particles according to claim 8.

11. A spherical activated carbon particle obtained by activating the spherical carbon particle according to claim 9.

12. A spherical activated carbon particle obtained by activating the spherical carbon particle according to claim 10.

\* \* \* \* \*